United States Patent
McGee

(10) Patent No.: US 10,220,867 B1
(45) Date of Patent: Mar. 5, 2019

(54) CART BASKET LOCKING ASSEMBLY

(71) Applicant: Elizabeth McGee, Houston, TX (US)

(72) Inventor: Elizabeth McGee, Houston, TX (US)

(*) Notice: Subject to any disclaimer, the term of this patent is extended or adjusted under 35 U.S.C. 154(b) by 0 days.

(21) Appl. No.: 15/692,535

(22) Filed: Aug. 31, 2017

(51) Int. Cl.
B62B 3/14 (2006.01)
B62B 3/00 (2006.01)

(52) U.S. Cl.
CPC .............. B62B 3/146 (2013.01); B62B 3/005 (2013.01); B62B 2501/06 (2013.01)

(58) Field of Classification Search
CPC ...... B62B 3/146; B62B 3/005; B62B 2501/06
See application file for complete search history.

(56) References Cited

U.S. PATENT DOCUMENTS

| 3,534,973 | A | * | 10/1970 | Elliott | B62B 3/1468 280/33.992 |
|---|---|---|---|---|---|
| 4,361,340 | A | * | 11/1982 | Soriano | B62B 3/146 280/33.992 |
| 4,643,280 | A | * | 2/1987 | Hensley | A45C 3/02 108/44 |
| 4,702,402 | A | * | 10/1987 | Ferri | B62B 3/1428 220/23.4 |
| 5,002,215 | A | * | 3/1991 | Gregoire | B62B 3/1428 206/425 |
| 5,002,292 | A | * | 3/1991 | Myers | B62B 3/146 280/33.992 |
| D321,798 | S | * | 11/1991 | Buckley | D18/59 |
| 5,494,308 | A | * | 2/1996 | Southerland | B62B 3/146 220/495.01 |
| 5,542,687 | A | * | 8/1996 | Harris | B62B 3/146 280/33.993 |
| 5,915,631 | A | * | 6/1999 | Laxton | A45C 13/20 24/302 |
| 6,766,931 | B2 | * | 7/2004 | Wolf | B62B 3/1464 224/411 |
| 6,966,565 | B1 | * | 11/2005 | Ryan | B62B 3/1464 280/33.992 |
| 9,027,941 | B2 | * | 5/2015 | Cimino | B62B 3/027 280/47.35 |
| 9,725,105 | B2 | * | 8/2017 | Yu | B62B 3/146 |
| 2002/0134806 | A1 | * | 9/2002 | Wolf | B62B 3/1464 224/411 |
| 2003/0085538 | A1 | * | 5/2003 | Mansons | B62B 3/146 280/33.992 |
| 2009/0140505 | A1 | * | 6/2009 | Fryer | B62B 3/1408 280/33.994 |
| 2009/0261545 | A1 | * | 10/2009 | Jones | B62B 3/1472 280/33.994 |

(Continued)

FOREIGN PATENT DOCUMENTS

WO    WO2009073651    6/2009

*Primary Examiner* — Jacob B Meyer

(57) ABSTRACT

A cart basket locking assembly for securing valuables in a shopping cart includes a cart, such as for using in a supermarket. A basket is coupled to and is positioned the cart. The basket, which is positioned proximate to a first end of the cart, has a top that is open. A cover is hingedly coupled to the basket. The cover is selectively and lockably couplable to the cart to close the top of the basket. The cover is positioned to selectively couple to the cart to close the top of the basket. The cover also is positioned to be locked to secure at least one article, such as a purse, within the basket.

6 Claims, 5 Drawing Sheets

(56) References Cited

U.S. PATENT DOCUMENTS

2014/0035244 A1* 2/2014 Bello ................. B62B 3/146
                                                280/33.994
2016/0185375 A1* 6/2016 Yu .................... B62B 3/146
                                                224/411

* cited by examiner

CART BASKET LOCKING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to locking assemblies and more particularly pertains to a new locking assembly for securing valuables in a shopping cart.

BRIEF SUMMARY OF THE INVENTION

An embodiment of the disclosure meets the needs presented above by generally comprising a cart, such as for using in a supermarket. A basket is coupled to and is positioned the cart. The basket, which is positioned proximate to a first end of the cart, has a top that is open. A cover is hingedly coupled to the basket. The cover is selectively and lockably couplable to the cart to close the top of the basket. The cover is positioned to selectively couple to the cart to close the top of the basket. The cover also is positioned to be locked to secure at least one article, such as a purse, within the basket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
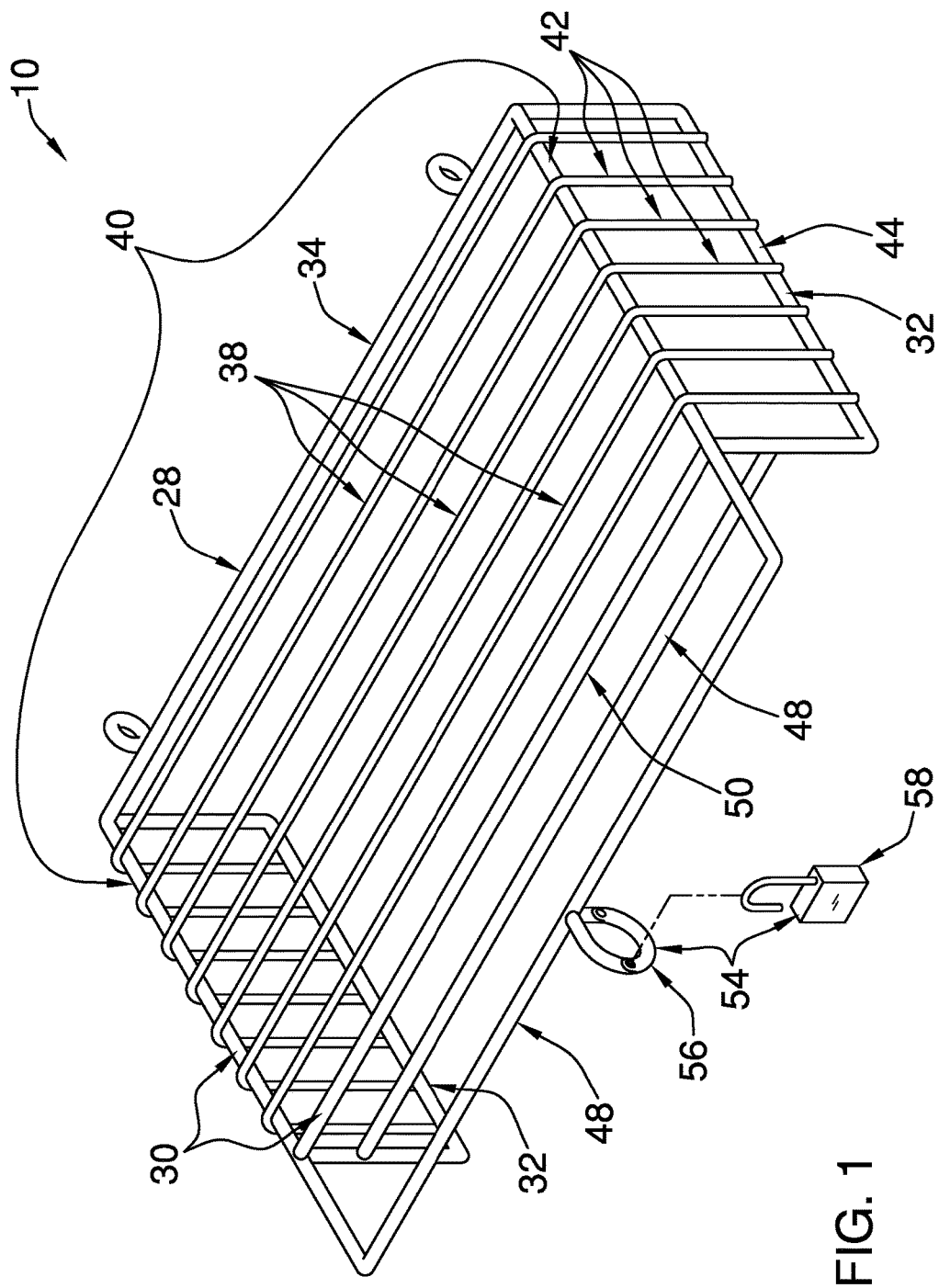
FIG. 1 is an isometric perspective view of a cart basket locking assembly according to an embodiment of the disclosure.
Figure 2:
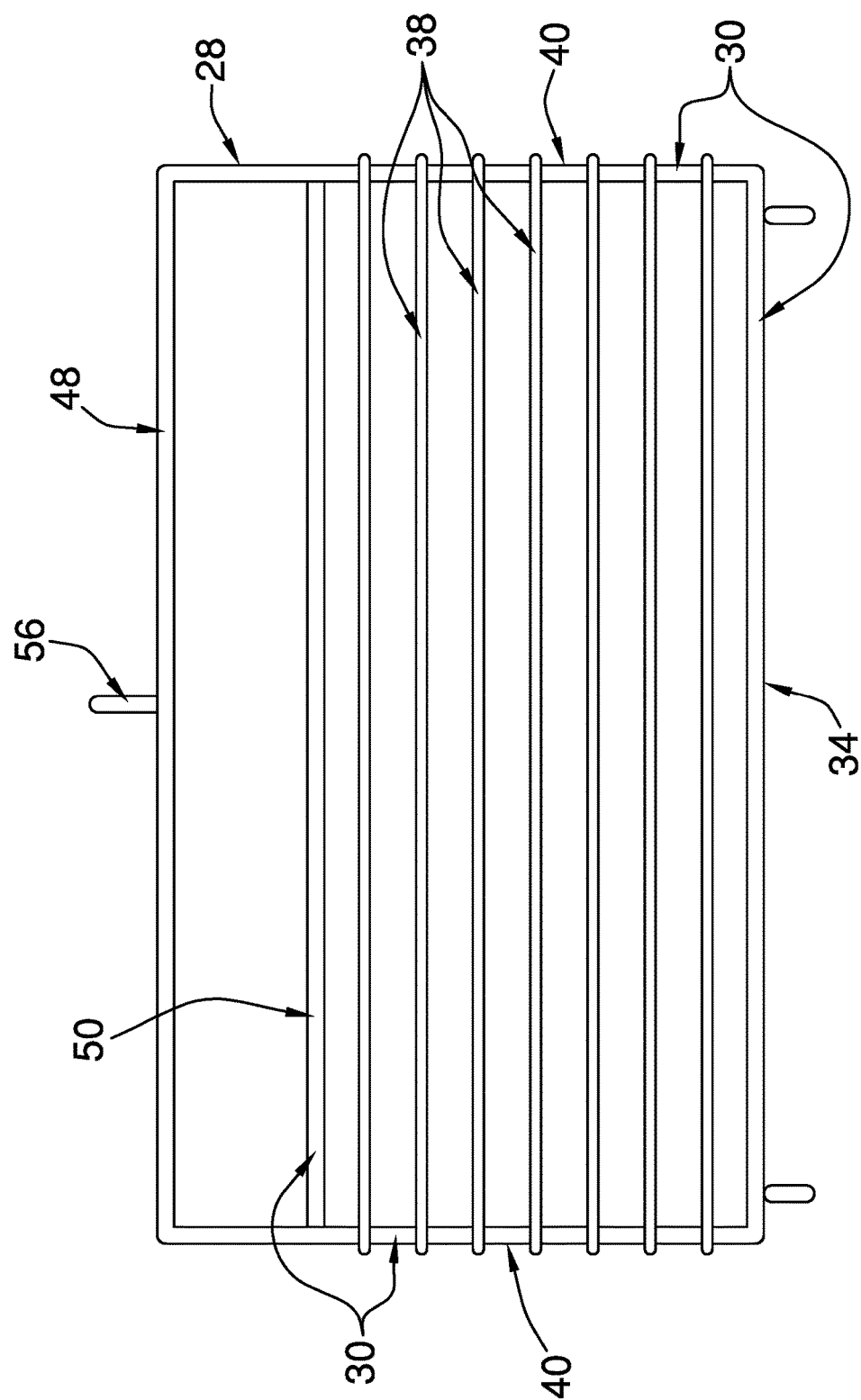
FIG. 2 is a top view of an embodiment of the disclosure.
Figure 3:
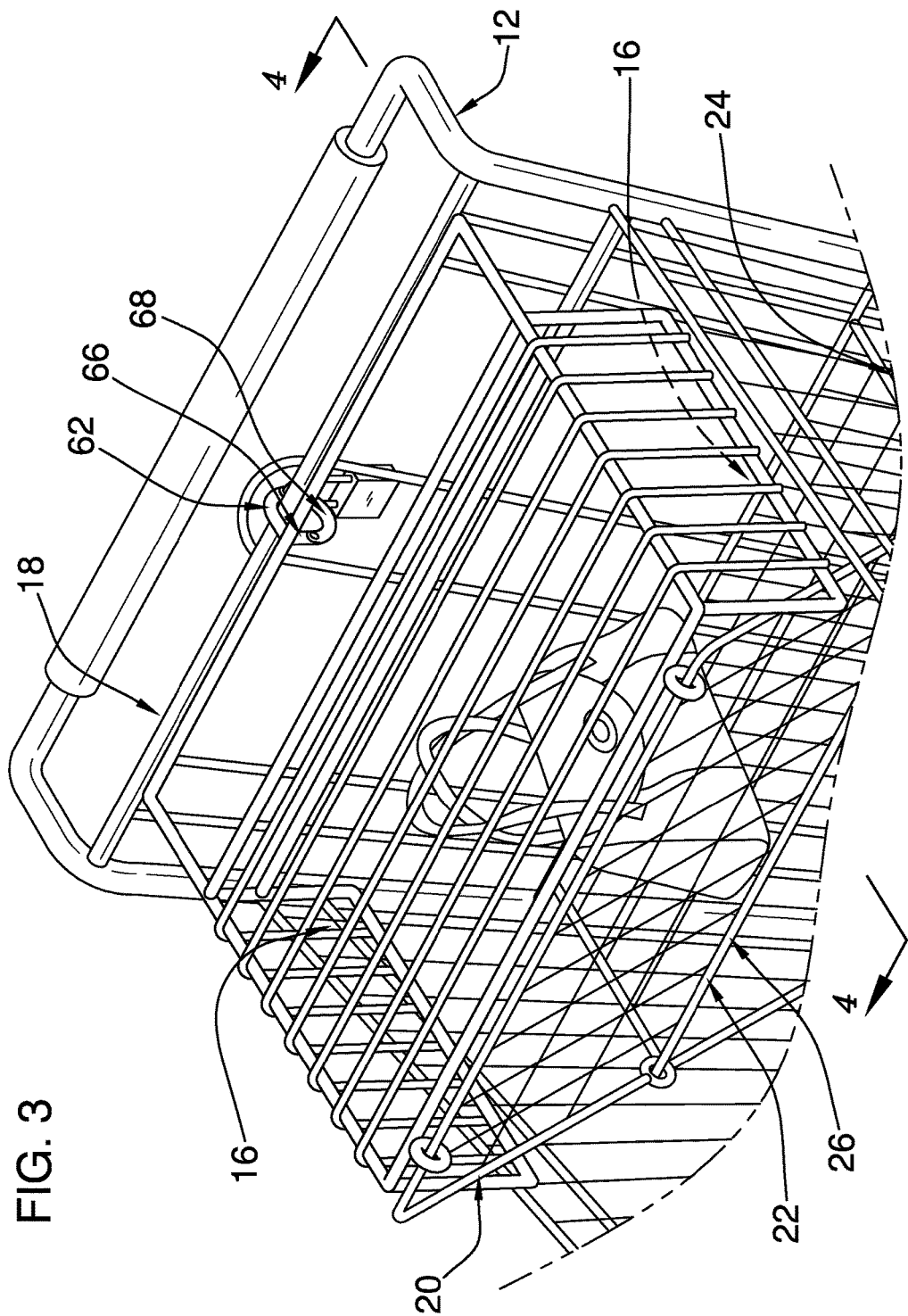
FIG. 3 is an in-use view of an embodiment of the disclosure.
Figure 4:
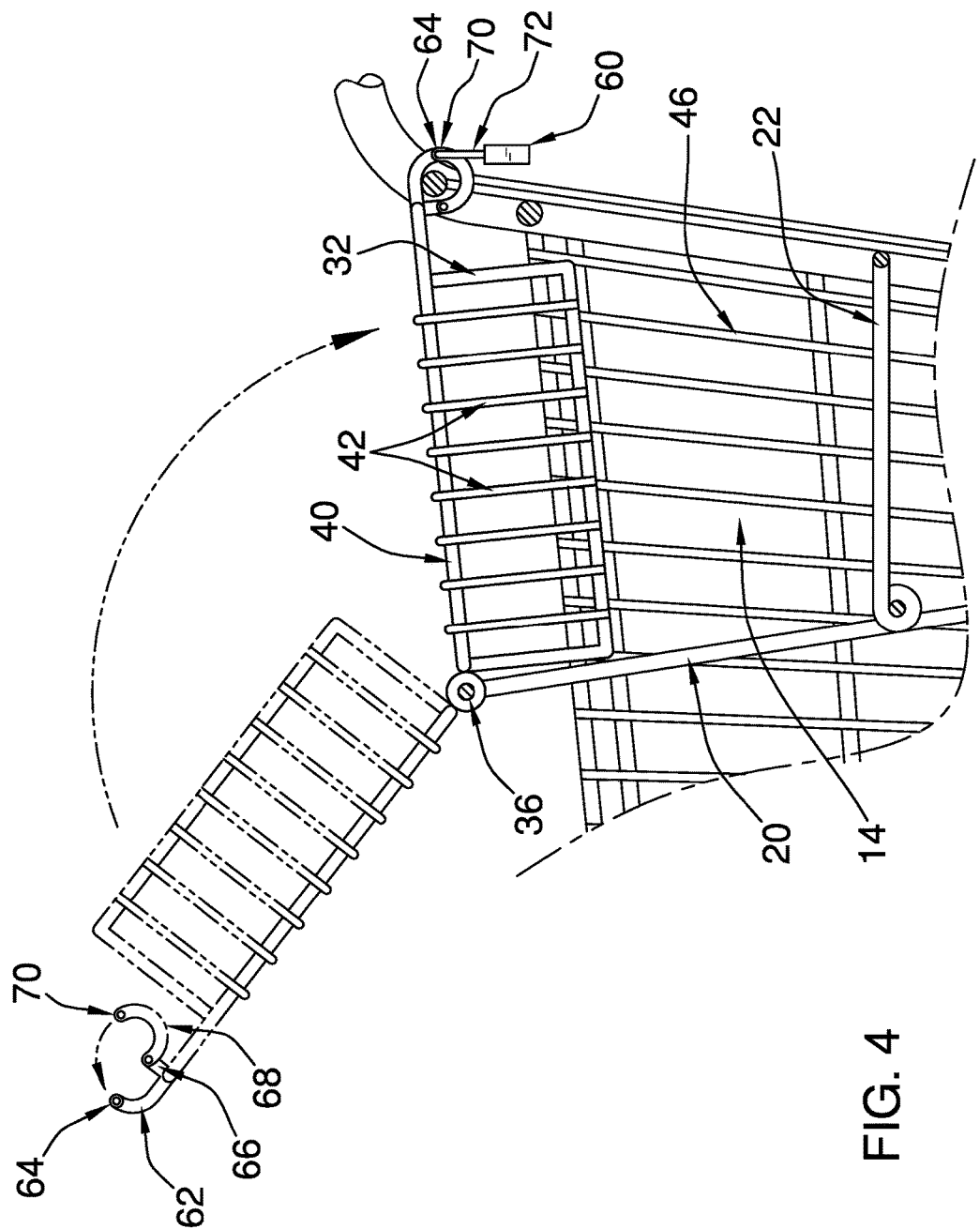
FIG. 4 is a cross-sectional view of an embodiment of the disclosure.
Figure 5:
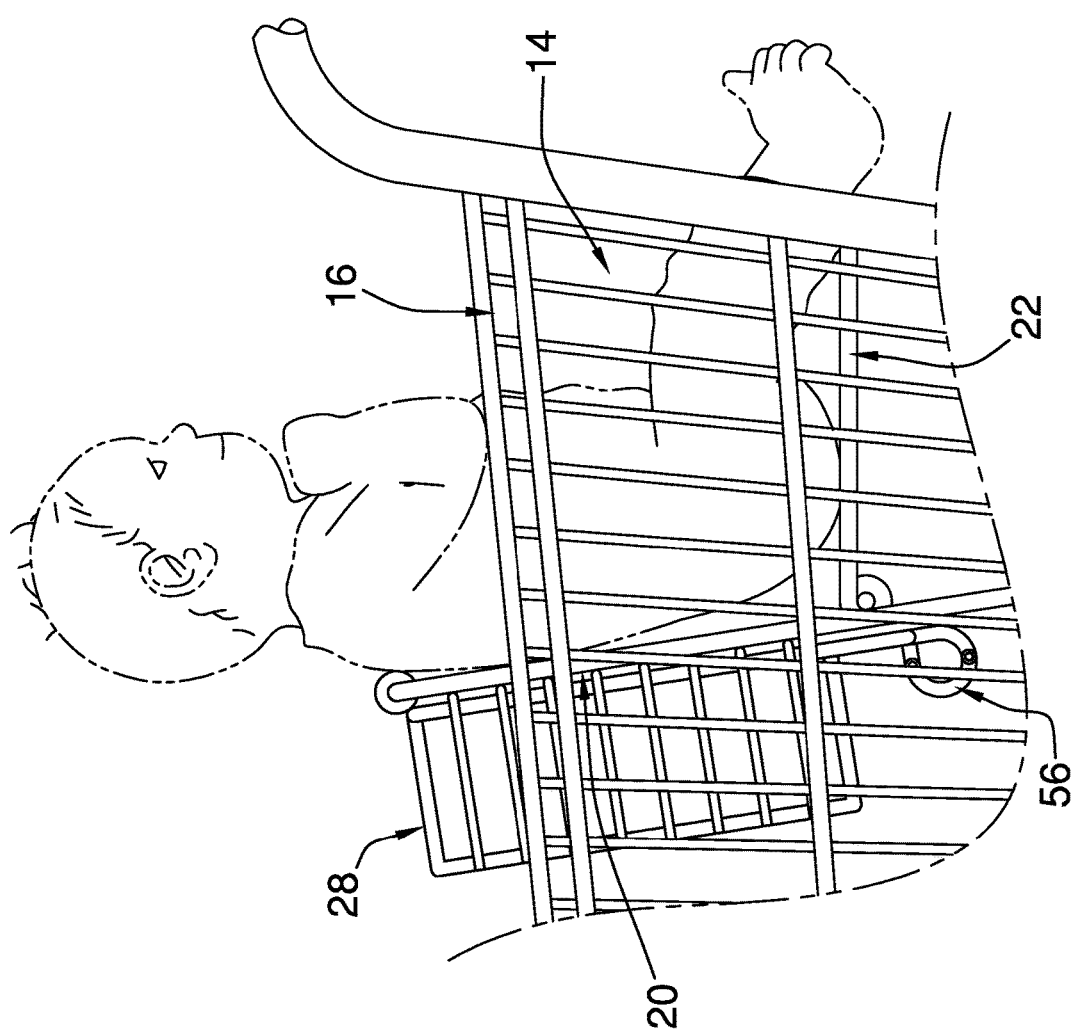
FIG. 5 is a side view of an embodiment of the disclosure.

With reference now to the drawings, and in particular to FIGS. 1 through 5 thereof, a new locking assembly embodying the principles and concepts of an embodiment of the disclosure and generally designated by the reference numeral 10 will be described.

As best illustrated in FIGS. 1 through 5, the cart basket locking assembly 10 generally comprises a cart 12, such as for use in a supermarket. A basket 14 is coupled to and is positioned the cart 12. The basket 14 has a top 16 that is open. The basket 14 is positioned proximate to a first end 18 of the cart 12.

In one embodiment, the basket 14 comprises a first grate 20 and a second grate 22. The first grate 20 is hingedly coupled to a bottom 24 of the cart 12. The first grate 20 is positioned proximate to the first end 18 of the cart 12. The second grate 22 is hingedly coupled to the first end 18 of the cart 12 and is slidably coupled to the first grate 20. The basket 14 is selectively deployable by pivoting the first grate 20 distally from the first end 18 of the cart 12. The second grate 22 defines a lower end 26 of the basket 14.

A cover 28 is hingedly coupled to the basket 14. The cover 28 is selectively and lockably couplable to the cart 12 to close the top 16 of the basket 14. The cover 28 is positioned to selectively couple to the cart 12 to close the top 16 of the basket 14. The cover 28 also is positioned to be locked to secure at least one article, such as a purse, within the basket 14. In one embodiment, the cover 28 is grated. In another embodiment, the cover 28 comprises metal. In yet another embodiment, the cover 28 comprises plastic.

The cover 28 comprises a first frame 30 and a pair of second frames 32. The first frame 30 is hingedly coupled by a first edge 34 to an upper end 36 of the first grate 20. A plurality of first rods 38 is coupled to and extends between opposing edges 40 of the first frame 30. The first frame 30 is positioned to close the top 16 of the basket 14. Each second frame 32 is coupled to and extends substantially perpendicularly from a respective opposing edge 40 of the first frame 30. Each of a plurality of second rods 42 is coupled to and extends between the respective opposing edge 40 of the first frame 30 and a rim 44 of a respective second frame 32. Each second frame 32 is positioned to close a respective opposing side 46 of the basket 14.

A third frame 48 is coupled to and extends coplanarly from a second edge 50 of the first frame 30. In one embodiment, a third rod 52 is coupled to and extends between the second frames 32. The third rod 52 is positioned between the second edge 50 of the frame and the rims 44 of the second frames 32.

A coupler 54 is coupled to the third frame 48. The coupler 54 is configured to selectively and lockably couple to the cart 12 to fixedly position the first frame 30 over the top 16 and the second frames 32 over the opposing sides 46 of the basket 14. The at least one article, such as the purse, is secured within the basket 14.

In one embodiment, the coupler 54 comprises a latch 56 and a lock 58. The latch 56 is configured to selectively couple to the cart 12. The lock 58 is configured to couple to the latch 56 so that the latch 56 is lockably coupled to the cart 12 to fixedly position the first frame 30 over the top 16 and the second frames 32 over the opposing sides 46 of the basket 14. The at least one article, such as the purse, is secured within the basket 14.

In another embodiment, the lock 58 comprises a padlock 60. The latch 56 comprises a first section 62 that is coupled to and extends coplanarly from the first frame 30. The first section 62 is arcuate distal from the first frame 30. A first penetration 64 is positioned through the first section 62 distal from the first frame 30. A second section 66 is coupled to and extends perpendicularly from the first frame 30. A third section 68 is hingedly coupled to the second section 66 distal from the first frame 30. The third section 68 is arcuate distal from the second section 66. The third section 68 is positioned to pivot relative to the second section 66 to couple the latch 56 to the cart 12. A second penetration 70 is positioned through the third section 68 distal from the second section 66. The second penetration 70 is complementary to and selectively alignable with the first penetration 64. The second penetration 70 and the first penetration 64 are positioned to insert a shackle 72 of the padlock 60. The latch 56 is lockably coupled to the cart 12 to fixedly position the first frame 30 over the top 16 and the second frames 32 over the opposing sides 46 of the basket 14. The at least one article, such as the purse, is secured within the basket 14.

In use, the first grate 20 and the second grate 22 are positioned on the cart 12 so that the basket 14 is selectively deployable by pivoting the first grate 20 distally from the first end 18 of the cart 12. The second grate 22 defines the lower end 26 of the basket 14. The first rods 38 are positioned on the first frame 30 so that the first frame 30 is positioned to close the top 16 of the basket 14. The second rods 42 are positioned on the second frames 32 so that the second frames 32 are positioned to close the opposing sides 46 of the basket 14. The third section 68 of the latch 56 is positioned to pivot relative to the second section 66 to couple the latch 56 to the cart 12. The second penetration 70 and the first penetration 64 are selectively alignable to insert the shackle 72 of the padlock 60. The latch 56 is lockably coupled to the cart 12 to fixedly position the first frame 30 over the top 16 and the second frames 32 over the opposing sides 46 of the basket 14. The at least one article, such as the purse, is secured within the basket 14.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cart basket locking assembly comprising:
   a cart, such as for using in a supermarket;
   a basket coupled to and positioned said cart, said basket having a top, said top being open, said basket being positioned proximate to a first end of said cart, said basket comprising
      a first grate hingedly coupled to a bottom of said cart, said first grate being positioned proximate to said first end of said cart,
      a second grate hingedly coupled to said first end of said cart and slidably coupled to said first grate, and
      wherein said first grate and said second grate are positioned on said cart such that said basket is selectively deployable by pivoting said first grate distally from said first end of said cart such that said second grate defines a lower end of said basket;
   a cover hingedly coupled to said basket, said cover being selectively and lockably couplable to said cart for closing said top of said basket, said cover comprising
      a first frame hingedly coupled by a first edge to an upper end of said first grate,
      a plurality of first rods coupled to and extending between opposing edges of said first frame,
      a pair of second frames, each said second frame being coupled to and extending substantially perpendicularly from a respective said opposing edge of said first frame,
      a plurality of second rods, each said second rod being coupled to and extending between said respective said opposing edge of said first frame and a rim of a respective said second frame,
      a third frame coupled to and extending coplanarly from a second edge of said first frame,
   a coupler coupled to said third frame, said coupler being configured for selectively and lockably coupling to said cart, said coupler comprising a latch and a lock, said lock comprising a padlock, said latch being configured for coupling to said cart, said lock being configured for coupling to said latch such that said latch is lockably coupled to said cart, wherein said latch is positioned on said first frame such that said latch is positioned for selectively coupling to said cart, such that said lock is positioned for coupling to said latch, said latch comprising
      a first section coupled to and extending coplanarly from said first frame, said first section being arcuate distal from said first frame,
      a first penetration positioned through said first section distal from said first frame,
      a second section coupled to and extending perpendicularly from said first frame, a third section hingedly coupled to said second section distal from said first frame, said third section being arcuate distal from said second section, and a second penetration positioned through said third section distal from said second section, said second penetration being complementary to and selectively alignable with said first penetration, and wherein said first rods are positioned on said first frame such that said first frame is positioned for closing said top of said basket, wherein said second rods are positioned on said second frames such that each said second frame is positioned a respective opposing side of said basket, wherein said coupler is positioned on said first frame;

wherein said third section is positioned on said second section such that said third section is positioned for pivoting relative to said second section for coupling said latch to said cart, wherein said second penetration and said first penetration are selectively alignable such that said second penetration and said first penetration are positioned for inserting a shackle of said padlock;

said latch is lockably coupled to said cart, and said coupler is positioned for selectively and lockably coupling to said cart, for fixedly positioning said first frame over said top and said second frames over said opposing sides of said basket for securing the at least one article, such as a purse, within said basket; and wherein said cover is positioned on said basket such that said cover is positioned for selectively coupling to said cart for closing said top of said basket and for locking for securing at least one article, such as a purse, within said basket.

2. The assembly of claim 1, further including said cover being grated.

3. The assembly of claim 1, further including said cover comprising metal.

4. The assembly of claim 1, further including said cover comprising plastic.

5. The assembly of claim 1, further including a third rod coupled to and extending between said second frames, said third rod being positioned between said second edge of said frame and said rims of said second frames.

6. A cart basket locking assembly comprising:
a cart, such as for using in a supermarket;
a basket coupled to and positioned said cart, said basket having a top, said top being open, said basket being positioned proximate to a first end of said cart, said basket comprising:
a first grate hingedly coupled to a bottom of said cart, said first grate being positioned proximate to said first end of said cart, and
a second grate hingedly coupled to said first end of said cart and slidably coupled to said first grate, wherein said first grate and said second grate are positioned on said cart such that said basket is selectively deployable by pivoting said first grate distally from said first end of said cart such that said second grate defines a lower end of said basket;
a cover hingedly coupled to said basket, said cover being selectively and lockably couplable to said cart for closing said top of said basket, wherein said cover is positioned on said basket such that said cover is positioned for selectively coupling to said cart for closing said top of said basket and for locking for securing at least one article, such as a purse, within said basket, said cover being grated, said cover comprising metal, said cover comprising plastic, said cover comprising:
a first frame hingedly coupled by a first edge to an upper end of said first grate,
a plurality of first rods coupled to and extending between opposing edges of said first frame, wherein said first rods are positioned on said first frame such that said first frame is positioned for closing said top of said basket,
a pair of second frames, each said second frame being coupled to and extending substantially perpendicularly from a respective said opposing edge of said first frame,
a plurality of second rods, each said second rod being coupled to and extending between said respective said opposing edge of said first frame and a rim of a respective said second frame, wherein said second rods are positioned on said second frames such that each said second frame is positioned for closing a respective opposing side of said basket,
a third frame coupled to and extending coplanarly from a second edge of said first frame,
a third rod coupled to and extending between said second frames, said third rod being positioned between said second edge of said frame and said rims of said second frames,
a coupler coupled to said third frame, said coupler being configured for selectively and lockably coupling to said cart, wherein said coupler is positioned on said first frame such that said coupler is positioned for selectively and lockably coupling to said cart for fixedly positioning said first frame over said top and said second frame over said opposing sides of said basket for securing the at least one article, such as the purse, within said basket, said coupler comprising a latch and a lock, said latch being configured for coupling to said cart, said lock being configured for coupling to said latch such that said latch is lockably coupled to said cart, wherein said latch is positioned on said first frame such that said latch is positioned for selectively coupling to said cart, such that said lock is positioned for coupling to said latch such that said latch is lockably coupled to said cart for fixedly positioning said first frame over said top and said second frames over said opposing sides of said basket for securing the at least one article, such as the purse, within said basket, said lock comprising a padlock, said latch comprising:
a first section coupled to and extending coplanarly from said first frame, said first section being arcuate distal from said first frame,
a first penetration positioned through said first section distal from said first frame,
a second section coupled to and extending perpendicularly from said first frame,
a third section hingedly coupled to said second section distal from said first frame, said third section being arcuate distal from said second section, wherein said third section is positioned on said second section such that said third section is positioned for pivoting relative to said second section for coupling said latch to said cart,
a second penetration positioned through said third section distal from said second section, said second penetration being complementary to and selectively alignable with said first penetration, wherein said second penetration and said first penetration are selectively alignable such that said second penetration and said first penetration are positioned for inserting a shackle of said padlock such that said latch is lockably coupled to said cart for fixedly positioning said first frame over said top and said second frames over said opposing sides of said basket for securing the at least one article, such as the purse, within said basket; and wherein said first grate and said second grate are positioned on said cart such that said basket is selectively deployable by pivoting said first grate distally from said first end of said cart such that said second grate defines said lower end of said basket, wherein said first rods are positioned on said first frame such that said first frame is positioned for closing said top of said basket, wherein said second rods are positioned on said second frames such that said second frames are positioned for closing said opposing sides of said basket, wherein said third section is positioned on said second section such that said third section is positioned for pivoting relative to said second section for coupling said latch to said cart, wherein said second penetration and said first penetration are selectively alignable such that said second penetration and said first penetration are positioned for inserting said shackle of said padlock such that said latch is lockably coupled to said cart for fixedly positioning said first frame over said top and said second frames over said opposing sides of said basket for securing the at least one article, such as the purse, within said basket.

\* \* \* \* \*